_United States Patent Office_

3,453,422
Patented July 1, 1969

3,453,422
COMPUTER WEIGHING SYSTEM
William C. Susor, Oregon, Ohio, assignor, by mesne assignments, to The Reliance Electric and Engineering Company, Toledo, Ohio, a corporation of Ohio
Filed Mar. 15, 1965, Ser. No. 439,751
Int. Cl. G06f 15/20; G06g 7/48
U.S. Cl. 235—151.33
5 Claims

ABSTRACT OF THE DISCLOSURE

The disclosure describes a computer which uses the logic of an ordinary binary counter. The counter is divided into two two-stage flip-flops, one of the flip-flops selecting the four places in a multiplier to be multiplied one at a time and advancing the other one of the flip-flops which selects the three places in a multiplicand to be multiplied one at a time (partial products). When all of the partial products have been computed, the second flip-flop produces a program advance signal for the next computation. The two two-stage flip-flops also control partial products gating for pulse entry of the partial products into a register.

---

This invention relates to computing apparatus.

The computing apparatus is particularly suitable for use in the system for weighing, computing and printing a record of the weight and value of each of a plurality of successively weighed loads which is disclosed in U.S. application Ser. No. 429,230 filed Feb. 1, 1965, now Patent No. 3,384,193, in the names of William C. Susor and Orval J. Martin.

The objects of this invention are to provide new techniques for multiplying, to provide new computing systems, to improve computing techniques and apparatus, to simplify such apparatus, to increase the reliability of such apparatus, and to provide improved computing apparatus for condition measuring and indication systems.

The computer also features superior simplicity and versatility in that any and different codes can be used at the weight and price entries because the system merely needs coincidence between the weight entry and a counter and the price entry and another counter to be operative.

The above and other objects and features of this invention will be appreciated more fully from the following detailed description when read with reference to the accompanying drawings wherein.

Figure 1:
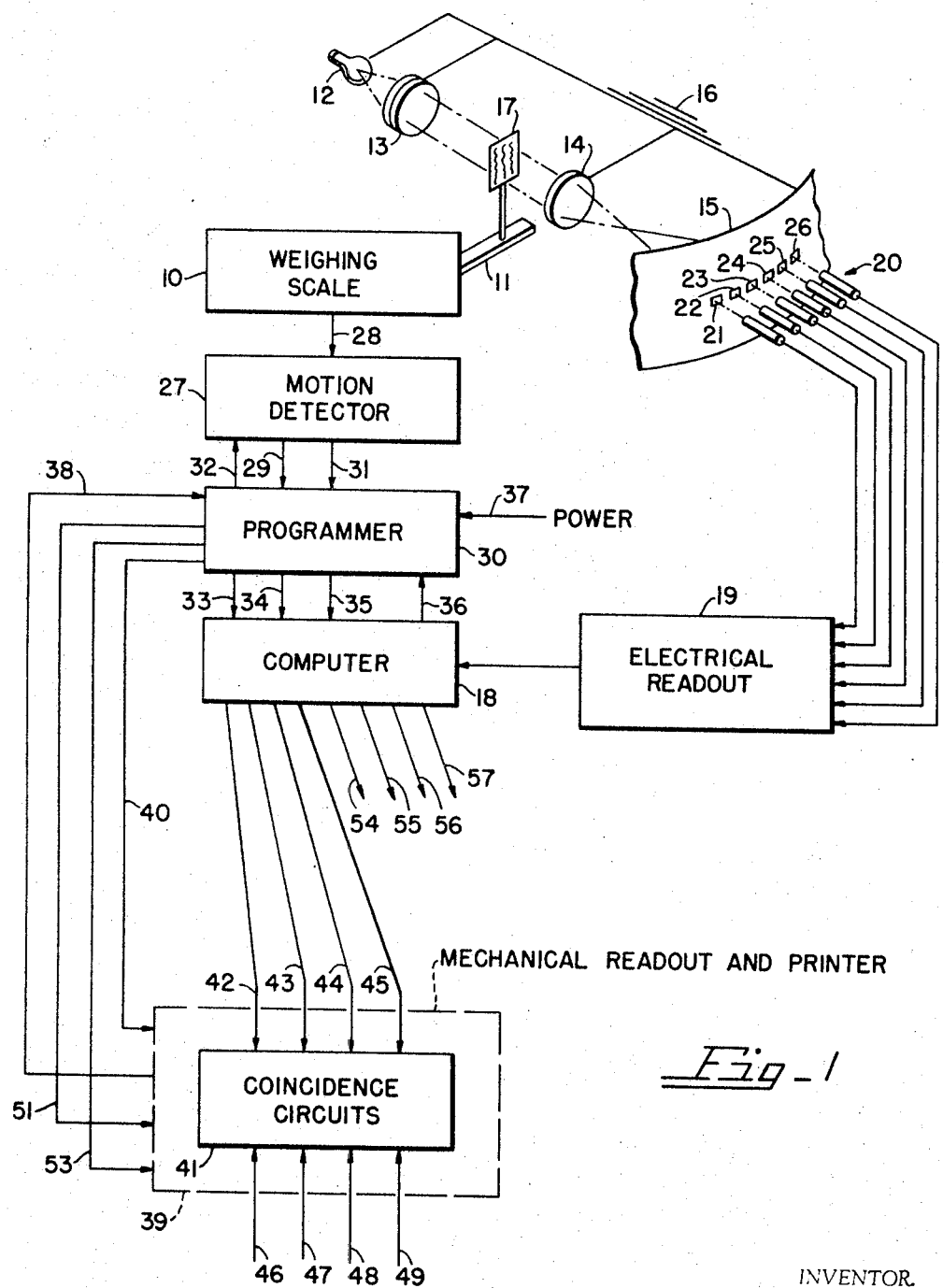
FIG. 1 is a schematic diagram illustrating the general organization of the weighing, computing and printing system with the computer of the invention combined therewith.

Referring to FIG. 1, a computing weighing scale 10 includes a lever 11 and an optical projection system which diagrammatically includes a light source 12, a condensing lens 13, a projection lens 14 and a photocell mask 15. The light source 12, the lenses 13 and 14, and the mask 15 are connected to ground as shown at 16 (e.g., base of weighing scale), the mask 15 being rigidly mounted with respect to the projection optics. A coded chart 17 is moved by the load-responsive lever 11 in the optical projection system, the chart 17, hence, being condition responsive. The computer 18 of the invention receives weight information from the scale and multiplies the weight of an article upon the scale by the unit price of such article to compute the value of such article. The computer 18 also multiplies such unit price times one so that it can produce a unit price output. The computer 18 has a weight input which is compatible with the parallel 1-2-4-8 binary coded decimal output of an electrical readout 19 in circuit therewith. The complete description of an analog to digital converter is not necessary to a full understanding of this invention. The above combination of weighing scale, optical projection system, electrical readout and computer is shown in the above U.S. application Ser. No. 429,230.

The chart 17 has a matrix of coded markings arranged in vertical bands so that the relative position thereof may be read by a bank of readout photocells 20, with one cell being associated with each column, providing an indication of the weight upon the scale. The output of the photocells is applied to the electrical readout 19, which makes available weight information to the input of the computer 18. The mask 15 is shown as being slitted at 21–26 so that a small and clearly defined portion of the projected image of the chart 17 is permitted to fall on each of the sensitive grids of the photocells, i.e., the mask screens out unwanted chart bits (the projection lens 14 projects all of the bits in its field of view). There is a total of fourteen photocells in the photocell bank 20, only six of the fourteen photocells being shown for the sake of simplicity. Fourteen photocells are enough to read out a chart capacity of 25.00 pounds.

The weighing scale 10 is connected operatively to a motion detector 27 through a connection 28 as also shown in the above U.S. application Ser. No. 429,230, the motion detector preventing erroneous weight readouts from taking place when the weighing mechanism is in motion as described in the application. The motion detector 27 applies no motion signals through a lead 29 to a programmer 30 as also shown in the above U.S. application Ser. No. 429,230. The motion detector 27 also applies motion signals through a lead 31 to the programmer 30 and receives conditioning signals from the programmer 30 through a lead 32.

The programmer 30 which is disclosed in detail in the above U.S. application Ser. No. 429,230 applies reset signals and command to compute signals through leads 33, 34 and 35, respectively, to the computer 18 and receives program advance signals through a lead 36 from the computer 18. The programmer 30 also receives power on signals through a lead 37 and coincidence check signals through a lead 38. The coincidence check signals indicate that the computer 18 and the read out positions of the number wheels in a mechanical readout and printer 39 agree. Similar coincidence check signals are described in the above U.S. application Ser. No. 429,230. The programmer 30 also applies a signal through a lead 40 to the mechanical readout and printer 39 commanding it to print.

As described in the above U.S. application Ser. No. 429,230, the programmer 30 is used in conjunction with a mechanical readout which is disclosed in U.S. application Ser. No. 416,526, filed Dec. 7, 1964, in the name of C. E. Adler. The readout includes a combination of a series of modules each comprising a detent wheel which is directly gear connected to a commutator and to a print wheel. Each module indicates the digits of a particular denominational order. When the turning print wheel approaches the correct indicating position, a stopping latch intercepts the correct one of the teeth of the detent wheel to arrest the detent wheel. Such readout also includes coincidence circuits 41 which receive 1-2-4-8 binary coded unit price signals from the computer 18 through leads 42–45 and 1-2-4-8 binary coded decimal signals through leads 46–49 indicative of the positions of the commutators. The detent wheels and thus the print wheels are stopped when the coincidence circuits determine that the wheels are in the correct indicating positions. The readout also includes a solenoid which when it receives a signal through a lead 51 permits a new reading to be made and a solenoid which when it receives a signal through a lead 53 unlocks the unit price indicating modules which otherwise remain locked to accomplish repeat printing without recycling such unit price indicating modules. Similarly, the coincidence circuits 41 receive 1–2–4–8 binary coded decimal value signals from the computer 18 through leads 54–57 and 1–2–4–8 binary coded decimal signals through leads not shown indicative of the positions of the commutators.

Although the various logic circuits mentioned herein are in common use in the electronic control field, a brief description of the function of each circuit is as follows. An AND logic circuit produces an output signal when, and only when, all of a plurality of input signals are present. A NOT logic circuit produces an output signal at all times unless an input signal is present. A MEMORY logic circuit sometimes known as a flip flop or bistable circuit has "ON" and "OFF" or reset input terminals, and "ON" and "OFF" output terminals. The MEMORY or bistable circuit produces an "ON" output signal in response to a signal applied at the "ON" input terminal and continues to produce the "ON" output signal, even though the input signal at the "ON" input terminal is removed, until a signal is applied to the "OFF" input terminal. The MEMORY circuit will then be turned "OFF" and produce an "OFF" output signal even though the signal at the "OFF" input terminal is removed. The MEMORY circuit will revert to its initial state upon application of a signal to the "ON" input terminal. An OR logic circuit produces an output upon receiving an input signal at any of a plurality of input terminals. For further details on the construction and operation of various types of logic circuits reference is made to an article entitled "Static Switching Devices," by Robert A. Mathias, in Control Engineering, May 1957. All of the logic circuits mentioned hereinafter, such as gates and flip flops, and the clock and diode matrix circuits are of conventional type. The connections between said circuits are clearly shown in the drawings and will not be described in detail.

Figure 2:
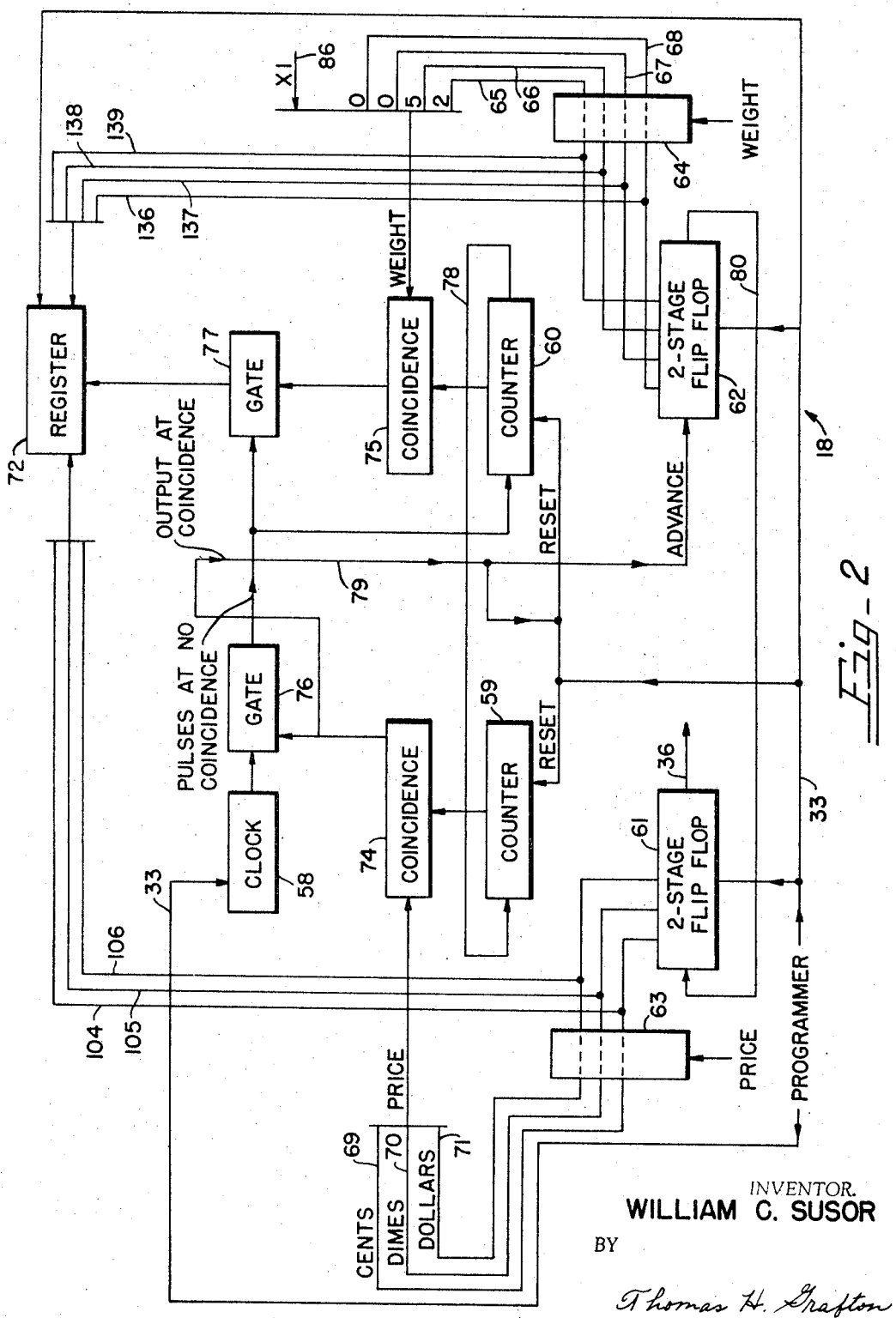
FIG. 2 is a block diagram of the computer shown in FIG. 1.
Figure 3:
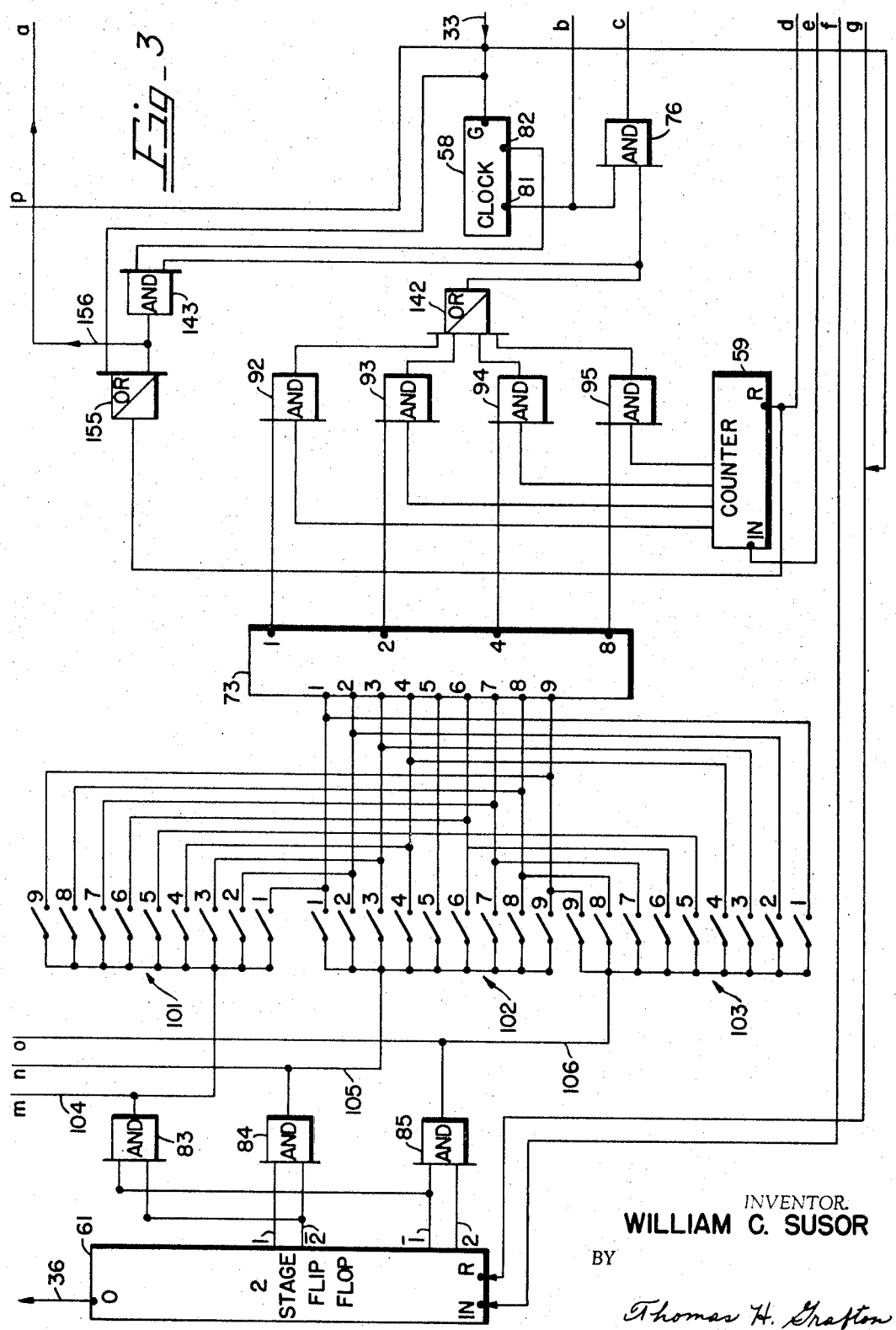
FIGS. 3, 4 and 5 are detailed block diagrams of the computer shown in FIG. 2.
Figure 4:
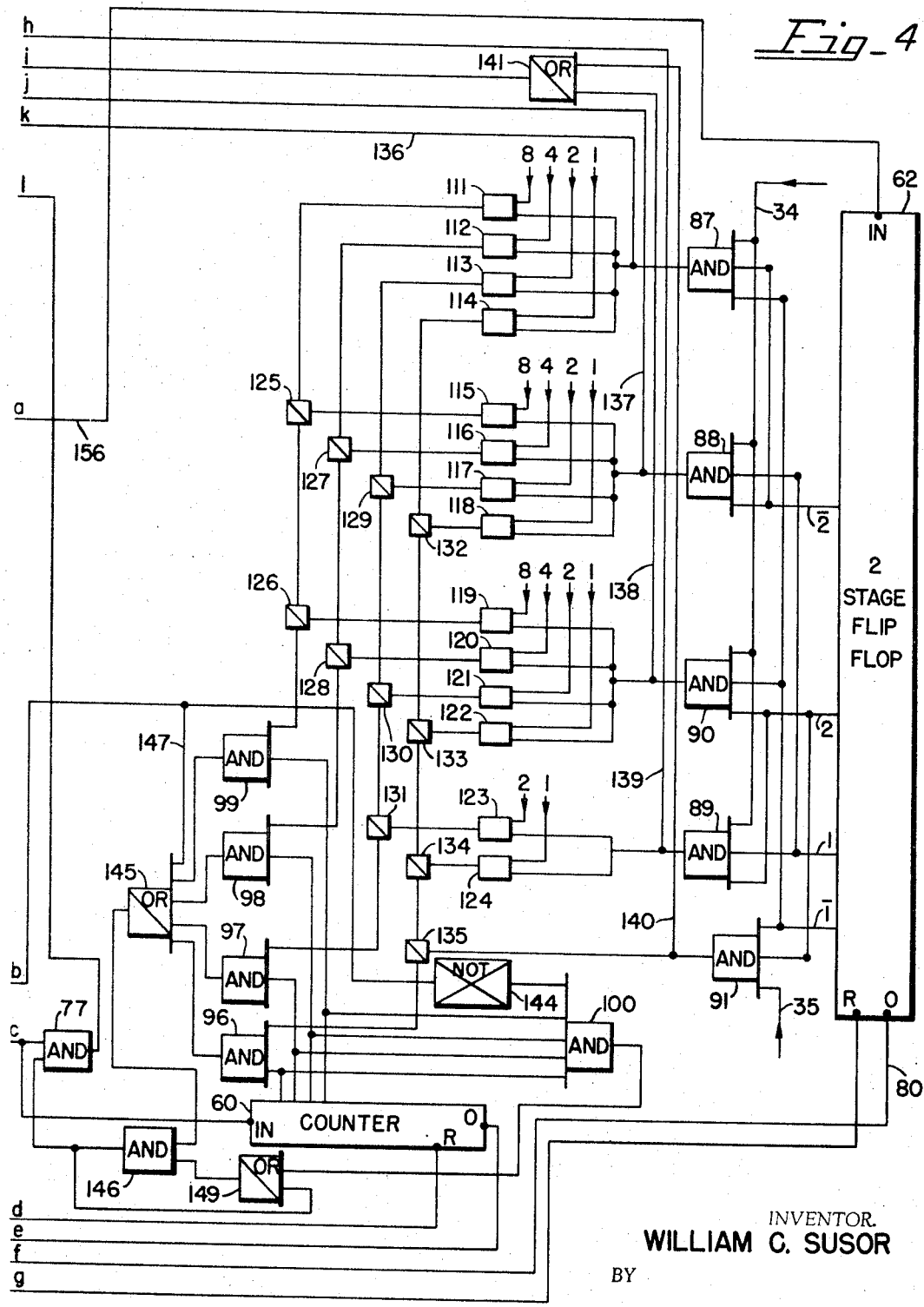
Figure 5:
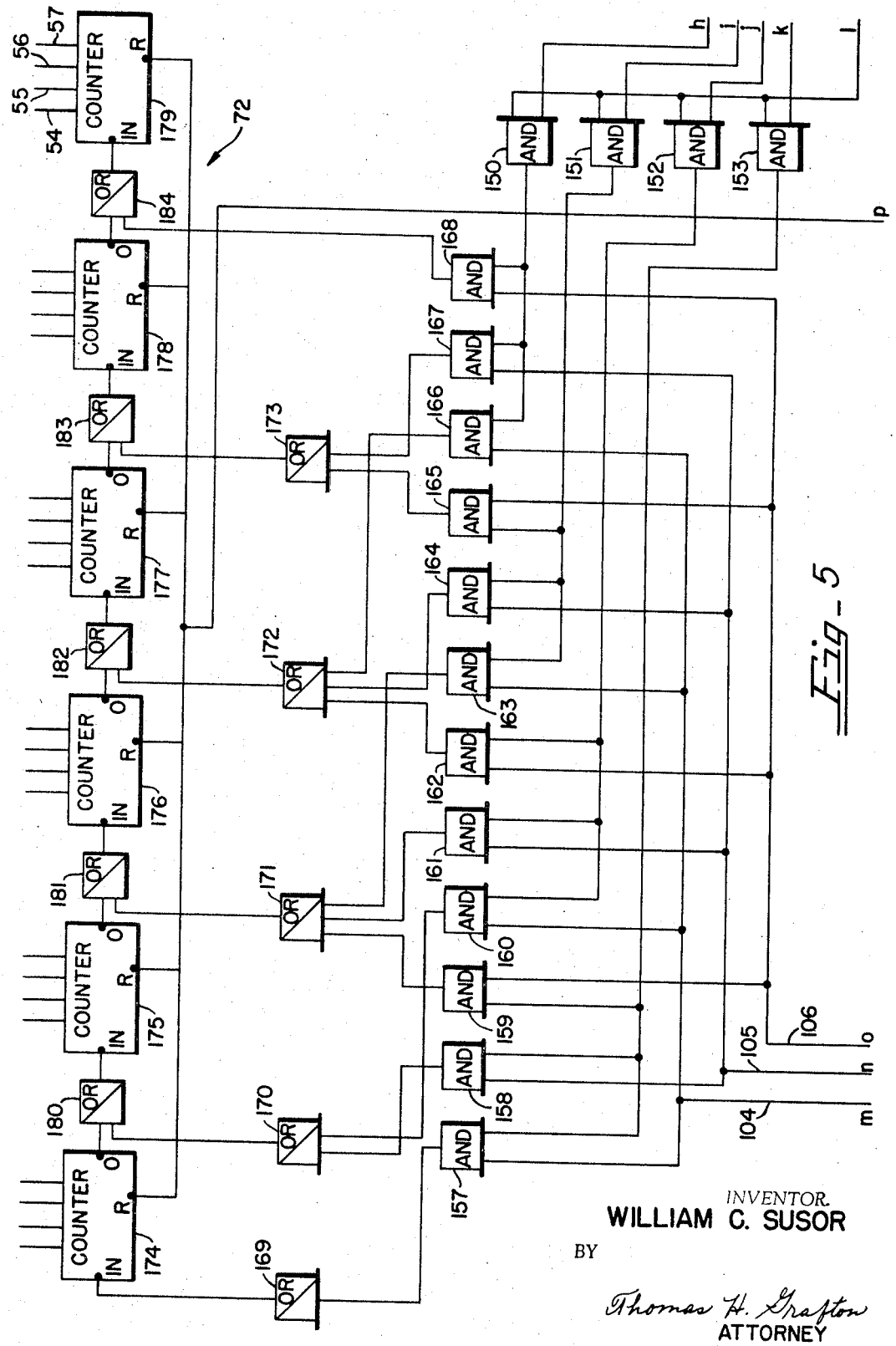

The computer 18 is shown in simplified block form in FIG. 2 and detailed block form in FIGS. 3, 4, and 5, FIG. 3 being connected to FIG. 4 at lead ends *a–g* and to FIG. 5 at lead ends *m–p* and FIG. 4 being connected to FIG. 5 at lead ends *h–l* to show the entire computer.

Referring to FIG. 2, the computer 18 includes a synchronized free running multivibrator or clock 58, which is gated on by a reset signal from the programmer 30 through the lead 33 (FIGS. 1–3), a conventional 1–2–4–8 binary counter 59, a conventional 1–2–4–8 binary coded decimal counter 60, and two two-stage flip flops 61 and 62 (bistable means), the counters 59 and 60, the two-stage flip flops 61 and 62, and a register 72 being reset at the start of a cycle by the same reset signal from the programmer 30 through the lead 33 which gates on the clock 58. Price entry is made in a price circuit 63 (first factor entering means) by moving price knobs or levers as described in the above U.S. application Ser. No. 429,230 and weight entry is made in a weight circuit 64 (second factor entering means) as described above, i.e., the parallel 1–2–4–8 binary coded decimal output of the electrical readout 19 (FIG. 1).

The two two-stage flip flops 61 and 62 each is identical to the two-stage flip flop shown in detail in FIG. 4 of the above U.S. application Ser. No. 429,230. The counters 59 and 60 each contain two of such two-stage flip flops, i.e., each of the two-stage flip flops 61 and 62 may be considered as half of a conventional 1–2–4–8 binary coded decimal counter which counts to three by the following code:

| 1 | 2 | 4 | 8 | Count | Binary Output |
|---|---|---|---|---|---|
| 0 | 0 | 0 | 0 | 0 | $\overline{1}\ \overline{2}$ — not 1 not 2 |
| 1 | 0 | 0 | 0 | 1 | $1\ \overline{2}$ — true 1 not 2 |
| 0 | 1 | 0 | 0 | 2 | $\overline{1}\ 2$ — not 1 true 2 |
| 1 | 1 | 0 | 0 | 3 | $2\ 2$ — true 1 true 2 |

The weighing scale 10 (FIG. 1) has a capacity of 25.00 pounds. Accordingly, leads 65–68 are labeled "2," "5," "0" and "0," respectively. The price entry circuit 63 has a capacity of $9.99. Hence, leads 69–71 are labeled "cents," "dimes" and "dollars," respectively. The least significant place in the selected price per pound is multiplied by each place in the weight figure using the least significant place first, etc., with pulse entry of the partial products made into the register 72 which includes a series of counter stages or sections that by partial products accumulation produces the final computed value figure. Then the procedure is repeated by multiplying the next place in the price per pound by each place in the weight figure and repeated again using the last place in the price per pound.

The decimal price entry is changed to 1–2–4–8 binary coded decimal by a conventional encoder or diode matrix 73 (FIG. 3) e.g., a decimal nine in produces a 1–8 binary output, and is applied to a coincidence circuit 74 (FIG. 2). The parallel 1–2–4–8 binary coded decimal weight output of the electrical readout 19 (FIG. 1) is applied to a coincidence circuit 75 (FIG. 2). At the start, with the clock 58 gated on and the counters 59 and 60 and the two-stage flip flops 61 and 62 reset, price entry upsets coincidence between the price entry and the count in the counter 59 as detected by the coincidence circuit 74 and weight entry upsets coincidence between the weight entry and the count in the counter 60 as detected by the coincidence circuit 75. The two-stage flip flop 61 in its reset state selects the "cents" place in the selected price per pound to be multiplied first and the two-stage flip flop 62 in its reset state selects the hundredths place in the weight figure to be multiplied first.

In the no coincidence state of the coincidence circuit 74, a gate 76 permits pulses from the clock 58 to be applied to a gate 77 and to the counter 60. In the no coincidence state of the coincidence circuit 75, the gate 77 is open and it passes the pulses to the register 72 to be counted. When the coincidence circuit 75 detects coincidence between the hundredths place in the weight entry and the count in the counter 60, the gate 77 is closed. However, the pulses continue to flow into the counter 60 which resets on the tenth pulse and also applies the tenth pulse on a lead 78 to the input of the counter 59 to advance it. If the coincidence circuit 74 still does not detect coincidence, the process is repeated with pulses going through the gate 77 to the register 72 until the coincidence circuit 75 again detects coincidence. At coincidence the gate 77 is closed, but pulses continue to go into the counter 60 until it fills to reset itself and advance the counter 59. The process is repeated until the coincidence circuit 74 detects coincidence. This means that if "cents" price entry was a four and the hundredths weight figure was a three, twelve pulses have been counted by the register, i.e., a partial product.

When the coincidence circuit 74 detects coincidence, an output from the gate 76 on a lead 79 resets the counters 59 and 60 and advances the two-stage flip flop 62 which in its count one state selects the tenths place in the weight figure to be multiplied next. The "cents" place in the price entry now is multiplied by the tenths place in the weight figure as described above with pulse entry of the partial product in the register 72 which accumulates the partial products, and another output from the gate 76 on the lead 79 resets the counters 59 and 60 and advances the two-stage flip flop 62 to its count two state, The two-stage flip flop 62 in its count two state selects the units place in the weight figure to be multiplied next. The "cents" place in the price entry now is multiplied by the units place in the weight figure as described above with pulse entry of the partial product in the register 72 and another output from the gate 76 resets the counters 59 and 60 and advances the two-stage flip flop 62 to its count three state.

The two-stage flip flop 62 in its count three state selects the tens place in the weight figure to be multiplied next. The "cents" place in the price entry now is multiplied by the tens place in the weight figure as described above with pulse entry of the partial product in the register 72 and another output from the gate 76 resets the counters 59 and 60 and resets the two-stage flip flop 62 to its count zero state which as it resets applies a pulse on a lead 80 to advance the two-stage flip flop 61 to its count one state.

The two-stage flip flop 61 in its count one state selects the "dimes" place in the price entry to be multiplied next. The above process is repeated until every place in the weight figure is multiplied by the "dimes" place in the price entry, whereupon the two-stage flip flop 62 resets and applies a pulse on the lead 80 to advance the two-stage flip flop 61 to its count two state.

The two-stage flip flop 61 in its count two state selects the "dollars" place in the price entry to be multiplied next. The above process is repeated until every place in the weight figure is multiplied by the "dollars" place in the price entry, whereupon the two-stage flip flop 62 resets and applies a pulse on the lead 80 to advance the two-stage flip flop 61 which applies an output on the lead 36 (FIGS. 1-3) to advance the programmer 30. The computed value now is stored in the register 72.

In the same manner, the computer 18 also multiplies the price entry times one (one applied on a lead 86) to produce a unit price figure which is stored in the register 72. The register 72 contains two series of counter stages one for computed value storage and the other for price storage.

Referring to FIGS. 3-5, the clock 58 has a gate terminal "G" to which the reset signal from the programmer 30 is applied through the lead 33 to gate on the clock and two output terminals 81 and 82. The clock 58 always starts negative putting such negative pulse on the terminal 81 while putting the positive portion of the pulse on the terminal 82. The two-stage flip flop 61, which is identical to the one shown in FIG. 4 of the above U.S. application Ser. No. 429,230, has four output leads identified by the numbers "1," "$\bar{2}$," "$\bar{1}$" and "2" just as are the four output leads shown in such FIG. 4 to produce binary outputs in accordance with the code set forth in the above table. At count zero, "$\bar{1}$" and "$\bar{2}$" outputs enable an AND gate 83; at count one, "1" and "$\bar{2}$" outputs enable an AND gate 84; and at count two, "$\bar{1}$" and "2" outputs enable an AND gate 85. The two-stage flip flop 61 also has output, in and reset terminals "0," "IN" and "R," respectively. The two-stage flip flop 62 also has four output leads identified by the numbers "$\bar{2}$," "2," "1," and "$\bar{1}$." At count zero, "$\bar{1}$" and "$\bar{2}$" outputs partially enable an AND gate 87; at count one, "1" and "$\bar{2}$" outputs partially enable an AND gate 88; at count two, "$\bar{1}$" and "2" outputs partially enable two AND gates 90 and 91; and at count three, "1" and "2" outputs partially enable AND gate 89. The two-stage flip flop 62 also has output, in and reset terminals "0," "IN" and "R," respectively. The 1-2-4-8 binary counter 59 has in and reset terminals "IN" and "R," respectively. In the reset condition, the four output leads of the counter 59 apply four outputs to AND gates 92-95, respectively, to partially enable such gates. The 1-2-4-8 binary coded decimal counter 60 has in, reset and output terminals "IN," "R" and "0," respectively. In the reset condition, the four output leads of the counter 60 apply four outputs to AND gates 96-99, respectively, to partially enable such gates. At the same time, all outputs from the counter 60 are applied to an AND gate 100 to partially enable it. The register 72 which is shown as a single block in FIG. 2 is shown as a series of counter stages in FIG. 5 together with partial product gating hereinafter described.

Price entry is made in a price circuit 63 as shown in FIG. 2 which includes a bank of nine "cents" contacts 101 (FIG. 3), a bank of nine "dimes" contacts 102, and a bank of nine "dollars" contacts 103 which are closed by setting the price knobs or levers to selected positions. The contacts are in circuit with the respective ones of terminals 1-9 in the diode matrix 73. The AND gate 83 when enabled by the two-stage flip flop 61 being in its reset state applies an output to a lead 104 (controls partial product gating hereinafter described) and to the bank of "cents" contacts 101; the AND gate 84 when enabled by the two-stage flip flop 61 being in its count one state applies an output to a lead 105 (controls partial product gating) and to the bank of "dimes" contacts 102; and the AND gate 85 when enabled by the two-stage flip flop 61 being in its count two state applies an output to a lead 106 (controls partial product gating) and to the bank of "dollars" contacts 103. The leads 104-106 are connected to the partial product gating shown in FIG. 5.

The decimal price entry, e.g., a price of $1.12, would connect a closed contact in the bank 101 to the "2" terminal of the diode matrix 73, a closed contact in the bank 102 to the "1" terminal of the diode matrix 73, and a closed contact in the bank 103 to the "1" terminal of the diode matrix 73, is changed to 1-2-4-8 binary coded decimal by the diode matrix 73. It is to be remembered that only one bank of contacts is energized at a time as programmed by the two-stage flip flop 61. When price contacts are closed, output terminals "1," "2," "4" and "8" of the diode matrix 73 apply inputs to the respective AND gates 92-95. For example, a decimal nine in produces a 1-8 binary output on output terminals "1" and "8" which is applied to AND gates 92 and 95.

Weight entry is made in a weight circuit 64 as shown in FIG. 2 which includes four AND gates 111-114 which receive the hundredths place parallel 1-2-4-8 binary coded decimal output of the electrical readout 19 (FIG. 1), four AND gates 115-118 which receive the tenths place parallel 1-2-4-8 binary coded decimal weight output, four AND gates 119-122 which receive the units place weight output, and two AND gates 123-124 which receive the tens place weight output (25.00 pounds weighing scale capacity). The outputs of AND gates 111 and 115 are applied through OR gates 125 and 126 to the AND gate 99 and the output of the AND gate 119 is applied through OR gate 126 to the AND gate 99. The outputs of AND gates 112 and 116 are applied through OR gates 127 and 128 to the AND gate 98 and the output of the AND gate 120 is applied through the OR gate 128 to the AND gate 98. The outputs of AND gates 113 and 117 are applied through OR gates 129-131 to the AND gate 97, the outputs of AND gate 121 is applied through the OR gates 130 and 131 to the AND gate 97, and the output of the AND gate 123 is applied through the OR gate 131 to the AND gate 97. The output of the AND gates 114 and 118 are applied through OR gates 132-135 to the AND gate 96, the output of AND gate 122 is applied through the OR gates 133-135 to the AND gate 96, the output of AND gate 124 is applied through OR gates 134 and 135 to the AND gate 96, and the output of the AND gate 91 is applied through the OR gate 135 to the AND gate 96. The function of the AND circuit 91 is not to make weight entry but to make entry of a factor of one which is multiplied by the price entry for the purpose of storing price information in the register 72. The output of AND gate 87 partially enables AND gates 111-114, the output of AND gate 88 partially enables AND gates 115-118, the output of AND gate 90 partially enables AND gates 119–122, and the output of AND gate 89 partially enables AND gates 123 and 124. AND gates 87, 88, 90, 89 and 91 also apply their outputs to leads 136–140, respectively, which are connected to the partial product gating (FIG. 5) hereinafter described. Leads 138 and 140 are in circuit with the input of an OR gate 141.

As described in connection with FIG. 2, at the start of a cycle the clock 58 is gated on and the counters 59 and 60, the two-stage flip flops 61 and 62, and the register 72 are reset by the reset signal from the programmer 30 through the lead 33. At the count zero, the "$\bar{1}$" and "$\bar{2}$" outputs of the reset flip flop 61 enable the AND gate 83 as described above to select the "cents" place in the price per pound to be multiplied first. Price entry is made as described above producing the 1–2–4–8 binary coded decimal output from the diode matrix 73. The coincidence circuit 74 shown in FIG. 2 includes the AND gates 92–95 and an OR gate 142 shown in FIG. 3. At count zero, the reset counter 59 has four outputs which partially enable the four AND gates 92–95. Price entry completely enables the respective ones of the AND gates 92–95 as described above and the outputs of the enabled AND gates 92–95 are applied to the OR gate 142 which in turn delivers an input to the AND gate 76 (FIGS. 2 and 3). When this output from the OR gate 142 ceases, the change in state is used as an input to an AND gate 143. Price entry upsets coincidence between the price entry and the count in the counter 59 as detected by the coincidence circuit and clock pulses are passed by the AND gate 76 as long as coincidence does not exist, the AND gate 76 being enabled by the outputs of the OR gate 142 and the clock 58. As described above, decimal price entry in each "1–9" place in the price figure is made by closing selected ones of the contacts 101–103. No contacts are needed for the "0" places in the price figure because coincidence already exists between the AND gates 92–95 and the count in the counter 59 (condition of circuit as shown with all of the contacts 101–103 open) when a "0" is selected to in effect multiply the weight entry by zero putting no pulses in the register 72 as the computer steps through its cycle.

At count zero, the "$\bar{1}$" and "$\bar{2}$" outputs of the reset two-stage flip flop 62 partially enable the AND gate 87 which is completely enabled by a command to multiply weight times price on the lead 34 from the programmer 30. However, before this happens a command from the programmer 30 to multiply one times price is applied to the computer from the lead 35 (FIGS. 1 and 4). Since multiplying one times price is done in the same manner as multiplying weight times price, for the sake of simplicity, the process will not be described except to note that at the beginning of the cycle when one is to be multiplied by price the two-stage flip flop 62 is in its count zero stage partially enabling the AND gate 87 which is not completely enabled because there is no input from the programmer 30 on the lead 34 resulting in zero being multiplied by price, then the two-stage flip flop 62 is advanced to its count one state with the same result, then the two-stage flip flop 62 is advanced to its count two state resulting in partial enabling of AND gates 90 and 91 with the same result as to AND gate 90, and then the two-stage flip flop 62 is advanced to its count three state with the same result. The partially enabled AND gate 91 is completely enabled by the command to multiply one times price on the lead 35 and the output of the enabled AND gate 91 is applied to the lead 140 (controlling partial product gating hereinafter described) and to the OR gate 135 which applies an input to the AND gate 96, whereupon one is multiplied times price as hereinafter described in connection with a description of multiplying weight times price. The unit price figure is stored in the register 72 in the same manner as the computed value figure is stored in the register. The register 72 contains figure and another for storing the computed value figure. For the sake of simplicity, only one series of counter stages is shown in FIG. 5. However, as shown in FIG. 1, leads 42–45 extend from the price counter stages and leads 54–57 extend from the computed value counter stages. As above described, the readout 39 (FIG. 1) includes coincidence circuits 41 which receive 1–2–4–8 binary coded unit price signals from the computer 18 through leads 42–45, i.e., from one series of counter stages, and 1–2–4–8 binary coded decimal value signals through leads 54–57, i.e., from the other respective series of counter stages.

After the selected price figure has been stored in the register 72, the price entry is multiplied again but this time by the weight entry to obtain the computed value. First, the clock 58 is gated on and the counters 59 and 60, the two-stage flip flops 61 and 62, and the register 72 are reset by the reset signal from the programmer 30 through the lead 33 and later the computer 18 receives the command to multiply weight times price on the lead 34 from the programmer 30 partially enabling AND gates 87, 88, 89 and 90. At count zero, the "$\bar{1}$" and "$\bar{2}$" outputs of the reset two-stage flip flop 62 completely enable the partially enabled AND gate 87. The enabled AND gate 87 applies its output to the lead 136 (controlling partial product gating hereinafter described) and to the inputs of AND gates 111–114 to select the hundredths place in the weight figure to be multiplied first. As above described, the hundredths place parallel 1–2–4–8 binary coded decimal output of the electrical readout 19 (FIG. 1), i.e., the weight entry, completely enables the respective ones of the AND gates 111–114 to in turn cause the respective AND gates 96–99 to be enabled, the four outputs from the reset counter 60 having already partially enabled such AND gates 96–99. The coincidence circuit 75 in FIG. 2 includes the AND gates 96–100, a NOT gate 144, and an OR gate 145. Weight entry completely enables the respective ones of the AND gates 96–99 as described above and the outputs of the enabled AND gates 96–99 are applied to the OR gate 145 which in turn delivers an input to an AND gate 146 partially enabling it. No weight entry for the "0" places in the weight figure is needed because coincidence already exists between the AND gates 96–99 and the count in the counter 60 before a weight entry is made to in effect multiply the price entry by zero putting no pulses in the register 72 as the computer steps through its cycle.

The negative pulse from the clock 58 also is applied to the NOT gate 144 which inverts the signal and applies it to the AND gate 100 which already is partially enabled by the four outputs of the reset counter 60 and the pulse from the clock 58 when it goes positive enables the OR gate 145 by way of a lead 147 if the OR gate 145 is not enabled already. The enabled AND gate 100 applies its output to an OR gate 149 having its output connected to the AND gate 146. The output of the AND gate 76 is connected to an input of the AND gate 77 (FIGS. 2 and 4), the output of the AND gate 77 being connected to inputs of AND gates 150–153 of the partial product gating shown in FIG. 5. The output of the AND gate 76 also is connected to the "IN" terminal of the counter 60.

The AND gate 146 which is enabled by inputs from the OR gates 145 and 149 enables the partially enabled AND gate 77 which passes clock pulses to be counted by the register 72 and the AND gate 76 applies pulses to be counted to the counter 60. Accordingly, as long as the coincidence circuit detects a condition of no coincidence between the weight entry and the count in the counter 60 pulses pass to the register 72 and to the counter 60. That is, weight entry upsets coincidence. When the count in the counter 60 reaches a state where the 1–2–4–8 coded output of the counter agrees with the 1–2–4–8 weight code set up on the AND gates 96–99, the respective counter outputs to the enabled ones of the AND gates 96–99 are cut off and such AND gates 96–99 are disabled and no outputs are applied by such AND gates 96–99 to the OR gate 145 (coincidence). As soon as the next clock pulse starts going negative, this signal is applied to the OR gate 145 through the lead 147 to disable it which in turn causes the AND gate 146 to be disabled. This in turn causes the AND gate 77 connected to the disabled AND gate 146 to close cutting off pulses to the register 72. However, pulses still flow from the AND gate 76 to the counter 60 which resets on the tenth pulse and applies such tenth pulse to the "IN" terminal of the counter 59 to advance it.

The OR gate 149 is a holding circuit which keeps the AND gate 146 on until it loses its input from the OR gate 145 because the output of the AND gate 146 is applied to the OR gate 149 which has its output in turn connected to the input of the AND gate 146. The counter 60 counts as soon as it receives a pulse that is starting to go positive. The OR gate 145 drops out as far as it is enabled by the positive pulse from the clock 58 on lead 147 as soon as the pulse starts going negative. This delay after coincidence between the count in the counter 60 and the weight entry set up on the AND gates 96–99 has been attained ensures full pulse count by not closing the AND gate 77, which is connected to the OR gate 145 through the AND gate 146, until it is certain that the register 72 has received the last pulse to be counted. This prevents a clock pulse from being cut short by the AND gate 77 when it is disabled. When the counter 60 is reset (resets and applies four outputs to the AND gate 100 as soon as it receives the tenth positive pulse), the AND circuit 100 is disabled by a negative input signal applied to it by the NOT gate 144. This ensures that the tenth pulse is not counted by the register 72.

Reset of the counter 60 upsets coincidence between its count and the weight entry and the process is repeated until the counter 59 is advanced to a point where its 1–2–4–8 coded output agrees with the 1–2–4–8 code set up on the AND gates 92–95. The respective counter outputs to the enabled ones of the AND gates 92–95 are cut off and such AND gates 92–95 are disabled and no outputs are applied by such AND gates 92–95 to the OR gate 142 (coincidence). This means that, if the "cents" place in the price entry was a two and the hundredths place in the weight entry was a four, eight pulses have been counted by the register 72, i.e., a partial product.

When coincidence circuit 74 (AND gates 92–95 and counter 59) detects coincidence, the output from the OR gate 142 changes sign and this input is applied to the AND gate 143 which already is enabled by the output from the clock 58. The enabled AND gate 143 enables an OR gate 155 and applies an advance signal on a lead 156 connected to the "IN" terminal of the two-stage flip flop 62 to advance it to its count one state. An input of the OR gate 155 also is connected to the lead 33 on which reset signals are applied from the programmer 30. The enabled OR gate 155 resets both counters 59 and 60 by applying reset signals to terminals "R" of such counters. The two-stage flip flop 62 in its count one state selects the tenths place in the weight figure to be multiplied next ("1" and "2̄" outputs together with the command to compute signal on the lead 34 enable the AND gate 88). The "cents" place in the price entry now is multiplied by the tenths place in the weight figure as described above with pulse entry of the partial product in the register 72 which accumulates the partial products, and another output from the AND gate 143 resets the counters 59 and 60 and advances the two-stage flip flop 62 to its count two state.

The two-stage flip flop 62 in its count two state selects the units place in the weight figure to be multiplied next ("1̄" and "2" outputs together with the command to compute signal on the lead 34 enable the AND gate 90). The "cents" place in the price entry now is multiplied by the units place in the weight figure as described above with pulse entry of the partial product in the register 72 and another output from the AND gate 143 resets the counters 59 and 60 and advances the two-stage flip flop 62 to its count three state.

The two-stage flip flop 62 in its count three state selects the tens place in the weight figure to be multiplied next ("1" and "2" outputs together with the command to compute signal on the lead 34 enable the AND gate 89). The "cents" place in the price entry now is multiplied by the tens place in the weight figure as described above with pulse entry of the partial product into the register 72 and another output from the AND gate 143 resets the counters 59 and 60 and resets the two-stage flip flop 62 to its count zero state which as it resets applies a pulse on the lead 80 (FIGS. 2–4) to advance the two-stage flip flop 61 to its count one state.

The two-stage flip flop 61 in its count one state ("1" and "2̄" outputs enable the AND gate 84) selects the "dimes" place in the price entry to be multiplied next. The above process is repeated until every place in the weight figure is multiplied by the "dimes" place in the price entry whereupon two-stage flip flop 62 resets and applies a pulse on the lead 80 to advance the two-stage flip flop 61 to its count two state.

The two-stage flip flop 61 in its count two state ("1̄" and "2" outputs enable the AND gate 85) selects the "dollars" place in the price entry to be multiplied next. The above process is repeated until every place in the weight figure is multiplied by the "dollars" place in the price entry, whereupon two-stage flip flop 62 resets and applies a pulse on the lead 80 to advance the two-stage flip flop 61 which then applies an output on the lead 36 (FIGS. 1–3) to advance the programmer 30. The computed value now is stored in register 72.

As described above, the leads 104–106 are connected to partial product gating shown in FIG. 5 which includes twelve AND gates 157–168. The partial product gating also includes the AND gates 150–153 each of which have an input connected to the output of the AND gate 77. The other input of the AND gate 150 is connected to the lead 139; the other input of the AND gate 151 is connected to the output of the OR gate 141, the inputs of the OR gate 141 being connected to the leads 138 and 140; the other input of the AND gate 152 is connected to the lead 137; and the other input of the AND gate 153 is connected to the lead 136. The inputs of the AND gate 157 are connected to the lead 104 and to the output of the AND gate 153, respectively; the inputs of the AND gate 158 are connected to the lead 105 and to the output of the AND gate 153, respectively; the inputs of the AND gate 159 are connected to the output of the AND 153 and to the lead 106, respectively; the inputs of the AND gate 160 are connected to the lead 104 and to the output of the AND gate 152, respectively; the inputs of the AND gate 161 are connected to the lead 105 and to the output of the AND gate 152, respectively; the inputs of the AND gate 162 are connected to the lead 106 and to the output of the AND gate 152, respectively; the inputs of the AND gate 163 are connected to the lead 104 and to the output of the AND gate 151, respectively; the inputs of the AND gate 164 are connected to the lead 105 and to the output of the AND gate 151, respectively; the inputs of the AND gate 165 are connected to the output of the AND gate 151 and to the lead 106, respectively; the inputs of the AND gate 166 are connected to the lead 104 and ot the output of the AND gate 150, respectively; the inputs of the AND gate 167 are connected to the lead 105 and to the output of the AND gate 150, respectively; and the inputs of the AND gate 168 are connected to the lead 106 and to the output of the AND gate 150, respectively.

The output of AND gate 157 is connected to the input of an OR gate 169; the output of AND gate 158 is connected to the input of an OR gate 170; the output of AND gate 159 is connected to the input of an OR gate 171; the output of the AND gate 160 is connected to the input of the OR gate 170; the output of the AND gate 161 is connected to an input of the OR gate 171; the output of the AND gate 162 is connected to an input of an OR gate 172; the output of the AND gate 163 is connected to an input of the OR gate 171; the output of the AND gate 164 is connected to an input of the OR gate 172; the output of the AND gate 165 is connected to an input of an OR gate 173; the output of the AND gate 166 is connected to an input of the OR gate 172; and the output of the AND gate 167 is connected to an input of the OR gate 173.

As described above the register 72 includes a series of counter stages that by partial product accumulation produces the final computed value figure. The register 72 includes six binary coded decimal counters 174–179 each like the counter 60 (FIG. 4). Each of the counters 174–179 includes input, reset and output terminals "IN," "R" and "0," respectively. The reset terminals "R" of the counters 174–179 are connected to the programmer reset lead 33. The "IN" terminal of the counter 174 is connected to the output of the OR gate 169 and the output terminal of the counter 174 is connected to an input of an OR gate 180, a second input of the OR gate 180 being connected to the output of the OR gate 170. The input of the counter 175 is connected to the output of the OR gate 180 and the output of the counter 175 is connected to an input of an OR gate 181, a second input of the OR gate 181 being connected to the output of OR gate 171. The input of the counter 176 is connected to the output of the OR gate 181 and the output of the counter 176 is connected to an input of an OR gate 182, a second input of the OR gate 182 being connected to the output of the OR gate 172. The input of the counter 177 is connected to the output of the OR gate 182 and the output of the counter 177 is connected to an input of an OR gate 183, a second input of the OR gate 183 being connected to the output of the OR gate 173. The input of counter 178 is connected to the output of the OR gate 183 and the output of the counter 178 is connected to an input of an OR gate 184, a second input of the OR gate 184 being connected to the output of the AND gate 168. The input of counter 179 is connected to the output of the OR gate 184. The output of the OR gate 169 fills the counter 174 until the tenth pulse spills over to the counter 175 through the OR gate 180, the output of the OR gate 170 also helping to fill the counter 175 through the OR gate 180. In a similar manner, counters 176–179 are each filled from two sources.

Counters 174–179 accumulate the 0.0001, 0.001, 0.01, 0.1, 1.0 and 10.0 decimal places in the computed value, respectively. Counters 174 and 175 are not used in indicating the end result and thus the total computed value capacity is $99.99. That is 0.0001+0.001+0.01+0.1+1.0+10.0 equals 11.1111

When the last two places are dropped, four places in the figure remain. Counter 175 could be preset with five counts in order to round off to the next higher cent. Counters 176–179 each puts a 1–2–4–8 binary coded decimal output on its four output leads one set of which is numbered 54–57 in FIG. 5 (Counter 179) and shown as the four leads 54–57 in FIG. 1. As above described, there are a commutator and a print wheel for each set of four output leads in the mechanical readout and printer 39 which are set up in accordance with the computed value count accumulated in the register 72. As also described above, there are a commutator and a print wheel for each set of four output leads 42–45 (FIG. 1) which are set up in accordance with the price count accumulated in the register 72.

When computing a value, the two-stage flip flop 61 selects in sequence (other sequences can be used) the "cents" and "dimes" and "dollars" places in the price entry to be multiplied one at a time by enabing in sequence the AND gates 83–85 and also selects the proper gates in the partial product gating by such enabling in sequence the AND gates 83–85 which have their outputs connected to leads 104–106, respectively. The two-stage flip flop 62 selects in sequence (other sequences can be used) the hundredths, tenths, units, and tens places in the weight entry to be multiplied one at at time by enabling in sequence the AND gates 87, 88, 90 and 89 and also selects the proper gates in the partial product gating by such enabling in sequence the AND gates 87, 88, 90 and 89 which have their outputs connected to leads 136–139. The outputs of the AND gates 87–90 partially enable the AND gates 150–153 (the output of AND gate 90 first enabling OR gate 141 which applies its output to the AND gate 151) which are enabled by clock pulses to be counted passing through the AND gate 77. Hence, the outputs of the price entry selection AND gates 83–85 and the outputs of the weight entry selection AND gates 150–153 enable the proper ones of the AND gates 157–168 to steer the clock pulses to the proper ones of the counters 174–179 so that the partial products are accumulated to the full computed value figure.

Taking as an example in which the counter 175 is not preset as described above, in multiplying $1.23 times 22.22 pounds which equals $27.33, as described above the two in the hundredths weight place is multiplied times the three in the "cents" place, then times the two in the "dimes" place, and then times the one in the "dollars" place. This causes the output from the hundredths place AND gate 153 and the outputs in sequence on leads 104–106 to first enable AND gate 157, then AND gate 158, and then AND gate 159. The enabled AND gate 157 permits six pulses to be fed to counter 174 (two in the hundredths weight entry times three in the "cents" place), the enabled AND gate 158 permits four pulses to be fed to counter 175 (two in the hundredths weight entry times two in the "dimes" place), and the enabled AND gate 159 permits two pulses to be fed to counter 176 (two in the hundredths weight entry times one in the "dollars" place). Then, the two in the tenths weight place is multiplied times the three in the "cents" place, then times the two in the "dimes" place, and then times the one in the "dollars" place. This causes the output from the tenths place AND gate 152 and the outputs in sequence on leads 104–106 to enable AND gates 160, 161 and 162 in sequence. The enabled AND gates 160–162 permit six pulses to be fed to counter 175, four pulses to counter 176 and two pulses to counter 177. Similarly, multiplying the two in the units weight place times the three places in the price entry and then multiplying the two in the tens weight place times the three places in the price entry causes partial products to accumulate in the counters 174–179.

In our example wherein $1.23 times 22.22 pounds equals $27.33, the partial products are entered and will accumulate to $27.3306 as shown in the following table:

| Counter 179 10.0 | Counter 178 1.0 | Counter 177 0.1 | Counter 176 0.01 | Counter 175 0.001 | Counter 174 0.0001 |
|---|---|---|---|---|---|
|  |  |  | 2 pulses | 4 pulses | 6 pulses |
|  |  | 2 pulses | 4 pulses | 6 pulses |  |
|  | 2 pulses | 4 pulses | 6 pulses |  |  |
| 2 pulses | 4 pulses | 6 pulses |  |  |  |
| $2 | 7 | 3 | 3 | 0 | 6 |

It is to be understood that the above description is illustrative of this invention and that various modifications thereof can be utilized without departing from its spirit and scope.

Having described the invention, I claim:

1. A computer comprising, in combination, first and second factor entering means for entering first and second factors, first and second counting means, resetting of the second counting means after it fills advancing the count in the first counting means, first coincidence means for detecting coincidence between a place in the first factor and the count in the first counting means, second coincidence means for detecting coincidence between a place in the second factor and the count in the second counting means, first and second bistable means for selecting places in the first and second factors, respectively, to be multiplied as partial products, resetting of the second bistable means after it fills advancing the count in the first bistable means, a source of pulses, first gate means in circuit with the first coincidence means for passing pulses from the source to the second counting means when a condition of no coincidence is detected by the first coincidence means, means for producing an output signal when coincidence is detected by the first coincidence means advancing the second bistable means to select the places in the second factor and resetting both of the counting means, register means having a plurality of sections so selected by both of the bistable means to receive the partial products that a computed value is accumulated, and second gate means in circuit with the second coincidence means and with the first gate means for passing pulses to the register when a condition of no coincidence is detected by the second coincidence means.

2. A computer according to claim 1 wherein partial product gating selects the register sections, the gating including a first plurality of gates enabled by pulses passed by the second gate means and signals controlled by the second bistable means and a second plurality of gates enabled by outputs from the first plurality of gates and signals controlled by the first bistable means.

3. In a system having a cycle of operations for weighing and computing the value in accordance with the weight and unit price of each of a plurality of successively weighed loads, in combination, weighing mechanism, computer means for computing said value of each weighed load, means for making weight information provided by the weighing mechanism available to the computer means, and price entering means for entering said unit price into the computer means, the computer means including bistable means for selecting places in the weight information and in the price to be multiplied to form partial products, means for producing pulses corresponding to the partial products, register means controlled by the bistable means for accumulating the pulses as the computed value, and means operable upon formation of each of the partial products for advancing the bistable means in steps until computation has been accomplished, whereby the computation time is varied in accordance with the partial product formation time.

4. In a system having a cycle of operations for weighing and computing the value in accordance with the weight and unit price of each of a plurality of successively weighed loads, in combination, weighing mechanism, computer means for computing said value of each weighed load, means for making weight information provided by the weighing mechanism available to the computer means, and price entering means for entering said unit price into the computer means, the computer means including two two-stage flip flops each having a reset position, one of the flip flops selecting places in the weight information and the other selecting places in the price to be multiplied to form partial products, means for producing pulses corresponding to the partial products, register means controlled by the flip flops for accumulating the pulses as the computed value, and means for producing a signal upon formation of each of the partial products to advance one of the flip flops, said advanced one of the flip flops producing an output signal when moving into said reset position to advance the other one of the flip flops, whereby the computation time is varied in accordance with the partial product formation time.

5. In a system having a cycle of operations for weighing and computing the value in accordance with the weight and unit price of each of a plurality of successively weighed loads and also for computing said unit price, in combination, weighing mechanism, computer means for computing said value and said unit price of each weighed load, means for making weight information provided by the weighing mechanism available to the computer means, price entering means for entering said unit price into the computer means, selecting means for selecting places in the weight information and in the unit price to be multiplied to form value partial products and for selecting places in the unit price to be multiplied by a factor of one to form unit price partial products, means for producing pulses corresponding to the partial products, and register means controlled by the selecting means for accumulating the pulses as the computed value and as the unit price.

References Cited

UNITED STATES PATENTS

| | | | |
|---|---|---|---|
| 2,963,222 | 12/1960 | Allen | 235—151 |
| 3,104,806 | 9/1963 | Allen | 235—58 |
| 3,300,626 | 1/1967 | A Te-An-Ling | 235—164 XR |
| 3,067,938 | 12/1962 | Springer | 235—156 |
| 3,084,285 | 4/1963 | Bell et al. | 235—151.33 X |
| 3,205,956 | 9/1965 | Bell et al. | 235—151.33 X |

MARTIN P. HARTMAN, *Primary Examiner.*

U.S. Cl. X.R.

177—3, 25; 235—58